US007711480B2

(12) United States Patent
Robbins

(10) Patent No.: US 7,711,480 B2
(45) Date of Patent: May 4, 2010

(54) DIFFERENTIAL GPS CORRECTIONS USING VIRTUAL STATIONS

(75) Inventor: James E. Robbins, Los Alamitos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 653 days.

(21) Appl. No.: 11/169,054

(22) Filed: Jun. 27, 2005

(65) Prior Publication Data

US 2006/0064244 A1 Mar. 23, 2006

Related U.S. Application Data

(63) Continuation of application No. 10/837,197, filed on Apr. 30, 2004, now abandoned, which is a continuation of application No. 09/019,495, filed on Feb. 5, 1998, now abandoned, which is a continuation of application No. 08/414,444, filed on Mar. 31, 1995, now abandoned, which is a continuation-in-part of application No. 08/177,012, filed on Jan. 3, 1994, now abandoned.

(51) Int. Cl.
*G06F 17/00* (2006.01)
*G01S 5/02* (2006.01)
(52) U.S. Cl. .................. 701/213; 701/207; 701/214; 342/357.02
(58) Field of Classification Search .............. 701/214, 701/301, 215, 213, 207; 340/991, 993, 990; 342/357.03, 352, 358, 357.02, 357.06, 357.08, 342/357.11, 357.01
See application file for complete search history.

(56) References Cited

U.S. PATENT DOCUMENTS 3,520,128 A 7/1970 Novikov et al.

3,811,265 A 5/1974 Cater
3,852,534 A 12/1974 Tilk (Continued)

FOREIGN PATENT DOCUMENTS

WO          WO 92/03747          3/1992

(Continued)

OTHER PUBLICATIONS

H. Abidin, Multi-Monitor Station "On-the Fly" Ambiguity Resolution: The Impacts of Satellite Geometry and Monitor Station Geometry, Plan '92 Position Location and Navigation Symposium, IEEE, 1992, pp. 412-418.

(Continued)

*Primary Examiner*—Khoi H. Tran
*Assistant Examiner*—Ronnie Mancho
(74) *Attorney, Agent, or Firm*—Bruce D Riter

(57) ABSTRACT

Method and apparatus for providing GPS pseudorange correction and carrier phase correction information for navigation or surveying activities over a selected geographic region S of arbitrary size. In a navigation mode, a virtual reference station (VRS), positioned near a selected location L, receives differential GPS (DGPS) correction signals, translates these signals into a selected format, and broadcasts this DGPS information in this format for use by a local user. In a survey mode, the VRS receives corrected GPS information, translates this information into a selected format and broadcasts this translated and corrected GPS information and the VRS location, for use by a mobile station in forming a baseline vector from the GPS mobile station to the VRS location.

17 Claims, 4 Drawing Sheets

U.S. PATENT DOCUMENTS

| | | | |
|---|---|---|---|
| 3,881,310 A | 5/1975 | Gerum et al. | |
| 3,941,984 A | 3/1976 | Chappell et al. | |
| 4,014,166 A | 3/1977 | Cateora et al. | |
| 4,042,923 A | 8/1977 | Merrick | |
| 4,204,398 A | 5/1980 | Lemelson | |
| 4,209,975 A | 7/1980 | Moritani et al. | |
| 4,218,654 A | 8/1980 | Ogawa et al. | |
| 4,287,597 A | 9/1981 | Paynter et al. | |
| 4,292,683 A | 9/1981 | Jueneman | |
| 4,334,314 A | 6/1982 | Nard et al. | |
| 4,337,463 A | 6/1982 | Vangen | |
| 4,449,830 A | 5/1984 | Bulgier | |
| 4,463,357 A | 7/1984 | MacDoran | |
| 4,482,255 A | 11/1984 | Gygax et al. | |
| 4,494,211 A | 1/1985 | Schwartz | |
| 4,512,667 A | 4/1985 | Doulton et al. | |
| 4,543,657 A | 9/1985 | Wilkinson | |
| 4,582,434 A | 4/1986 | Plangger et al. | |
| 4,607,257 A | 8/1986 | Noguchi | |
| 4,646,096 A | 2/1987 | Brown | |
| 4,751,512 A | 6/1988 | Longaker | |
| 4,797,677 A | 1/1989 | MacDoran et al. | |
| 4,809,005 A | 2/1989 | Counselman, III | |
| 4,814,711 A | 3/1989 | Olsen et al. | |
| 4,912,475 A | 3/1990 | Counselman, III | |
| 4,918,609 A | 4/1990 | Yamawaki | |
| 5,001,730 A | 3/1991 | Franaszek et al. | |
| 5,093,800 A | 3/1992 | Ifune | |
| 5,099,245 A | 3/1992 | Sagey | |
| 5,101,267 A | 3/1992 | Morales-Garza | |
| 5,111,209 A | 5/1992 | Toriyama | |
| 5,119,341 A * | 6/1992 | Youngberg | 367/5 |
| 5,130,987 A | 7/1992 | Flammer | |
| 5,138,631 A | 8/1992 | Taylor | |
| 5,148,179 A | 9/1992 | Allison | |
| 5,155,490 A | 10/1992 | Spradley, Jr. et al. | |
| 5,202,829 A | 4/1993 | Geier | |
| 5,220,333 A | 6/1993 | Penrod | |
| 5,223,923 A | 6/1993 | Morales-Garza | |
| 5,225,842 A | 7/1993 | Brown et al. | |
| 5,235,633 A | 8/1993 | Dennison et al. | |
| 5,243,530 A | 9/1993 | Stanifer et al. | |
| 5,245,634 A | 9/1993 | Averbuch | |
| 5,276,655 A | 1/1994 | Rialan et al. | |
| 5,323,322 A * | 6/1994 | Mueller et al. | 701/215 |
| 5,345,245 A | 9/1994 | Ishikawa et al. | |
| 5,359,521 A | 10/1994 | Kyrtsos et al. | |
| 5,365,447 A * | 11/1994 | Dennis | 701/215 |
| 5,379,224 A | 1/1995 | Brown et al. | |
| 5,379,320 A | 1/1995 | Fernandes et al. | |
| 5,389,934 A | 2/1995 | Kass | |
| 5,390,124 A | 2/1995 | Kyrtsos | |
| 5,422,813 A * | 6/1995 | Schuchman et al. | 455/440 |
| 5,442,363 A | 8/1995 | Remondi | |
| 5,450,448 A * | 9/1995 | Sheynblat | 375/346 |
| 5,621,646 A | 4/1997 | Enge et al. | |
| 5,828,336 A | 10/1998 | Yunck et al. | |
| 5,999,124 A | 12/1999 | Sheynblat | |
| 6,040,798 A | 3/2000 | Kinal et al. | |
| 6,061,018 A | 5/2000 | Sheynblat | |
| 6,185,427 B1 | 2/2001 | Krasner et al. | |
| 6,215,441 B1 | 4/2001 | Moeglein et al. | |
| 6,307,504 B1 | 10/2001 | Sheynblat | |
| 6,411,254 B1 | 6/2002 | Moeglein et al. | |
| 6,415,154 B1 | 7/2002 | Wang et al. | |
| 6,427,120 B1 | 7/2002 | Garin et al. | |
| 6,429,808 B1 | 8/2002 | King et al. | |
| 6,799,116 B2 | 9/2004 | Robbins | |
| 6,862,526 B2 | 3/2005 | Robbins | |

FOREIGN PATENT DOCUMENTS

| | | |
|---|---|---|
| WO | WO 93/00593 | 1/1993 |
| WO | WO 95/18977 | 7/1995 |

OTHER PUBLICATIONS

R. Barker et al., Performance Comparison of Two Methods of Multiple Reference Stations DGPS, Proceedings of ION GPS-94, Sep. 20-23, 1994, pp. 1035-1041.

Enge P. et al.: "Local Area Augmentation of GPS for the Precision Approach of Aircraft," Proceedings of the IEEE, IEEE, New York, US, vol. 87, No. 1, Jan. 1999, pp. 111-132.

P. Enge, Waas Messaging System: Data Rate, Capacity, and Forward Error Correction, Navigation: Journal of the Institute of Navigation, vol. 44, No. 1, Spring 1997, pp. 63-76.

P. Enge et al., Wide Area Augmentation of the Global Positioning System, Proceedings of the IEEE, vol. 84, No. 8, Aug. 1996, pp. 1063-1088.

Enge P. et al: "Design of the signal and data format for wide area augmentation of the Global Positioning System" Position Location and Navigation Symposium, IEEE 1996 Atlanta, Apr. 22-26, 1996, pp. 485-495.

A. Evans et al., An Evaluation of Precise Kinematic On-The Fly GPS Positioning with Respect to a Moving Aircraft, Proceedings of ION GPS-96, Sep. 12-15, 1995, pp. 1623-1628.

C. Goad, Surveying with GPS, The Global Positioning System, pp. 1-17.

F. Haas et al., GPS Wide Area Augmentation System (WAAS) Testbed Results—Phase 1D Testbed Results, ION Annual Meeting Jun. 6-8, 1994, pp. 239-248.

R. Hatch, The Promise of a Third Frequency, GPS World, May 1996, pp. 55-58.

H. Janes et al., Analysis of tropospheric delay prediction models: comparisons with ray-tracing and implications for GPS relative positioning, Bulletin Geodeslque, vo. 65, pp. 151-161, 1991.

C. Kee, Wide Area Differential GPS (WADGPS), Chang-don Kee, Dec. 1993, pp. 1-128.

C. Kee et al., Algorithms and Implementation of Wide Area Differential GPS, ION GPS-92 Proceedings, Sep. 16-18, 1992, pp. 565-572.

C. Kee et al., Wide Area Differential GPS, Navigation: Journal of the Institute of Navigation, vol. 38, No. 2, Summer 1991, pp. 123-145.

GPS Interface Control Document ICD-GPS-200, ARINC Research Corporation, Revision B, 1991.

M. Lage et al., The FAA's WIB/WDGPS Testbed and Recent Test Results, ION GPS-93 Proceedings, Sep. 22-24, 1993, pp. 487-493.

D. Lapucha et al., High-Rate Precise Real-Time Positioning Using Differential Carrier Phase, Navigation: Journal of the Institute of Navigation, vol. 43, No. 3, 1996, pp. 1443-1449.

D. Lapucha et al., Multisite Real-Time DGPS System Using Satellite Data Link: Operational Results, vol. 40, No. 3, Fall 1993, pp. 283-296.

D. Lapucha et al., Multi-Site Real-Time DGPS System Using Starfix Link: Operational Results, ION GPS-92 Proceedings, Sep. 16-18, 1992, pp. 581-588.

T. Logsdon, The Navstar Global Positioning System, Van Nostrand Reinhold, 1992.

J. Robbins, Reference Trajectories From GPS Measurements, Navigation: Journal of The Institute of Navigation, vol. 35, No. 1, Spring 1998, pp. 89-103.

T. Walter et al., Flight Trials of the Wide Area Augmentation system (WAAS) ION GPS-94 Proceedings, Sep. 20-23, 1994, pp. 1537-1546.

* cited by examiner

DIFFERENTIAL GPS CORRECTIONS USING VIRTUAL STATIONS

This patent application is a continuation of application. U.S. Ser. No. 10/837,197, filed on 30 Apr. 2004 now abandoned (the content of which is incorporated herein by this reference, which is a continuation of application, U.S. Ser. No. 09/019,495, filed on 5 Feb. 1998 now abandoned, which is a continuation of application, U.S. Ser. No. 08/414,444, filed on 31 Mar. 1995, which is a continuation in part of application, U.S. Ser. No. 08/177,012, filed on 3 Jan. 1994 now abandoned, and assigned to the Assignee of this application. This invention relates to a network of Global Positioning system stations for providing code phase or carrier phase differential corrections to enhance the accuracy of location information over a wide area.

FIELD OF THE INVENTION

Background of the Invention

Differential corrections for location information provided by a Global Positioning System (GPS) offer the possibility of reducing the inaccuracies in location and observation time provided by such system from tens of meters to one meter or less and tens of nanoseconds or less, respectively. However, differential GPS (DOPS) corrections for determinations of location and/or time are usually limited to a region no more than a few hundred kilometers (kin) in diameter. For regions of larger diameter, errors due to differences in ionospheric delay, tropospheric delay, satellite position errors and similar phenomena accumulate and can increase the total location error of a DGPS calculation to tens of meters or larger.

Several workers have disclosed time distribution systems using a master or base station and one or more subsidiary time signal receivers. An example is U.S. Pat. No. 3,520,128, issued to Novikov et al. An independent primary clock is connected to, and provides exact time signals for, a plurality of secondary clocks by radio waves. Each secondary clock receives a sequence of uncorrected "exact" time signals and a sequence of timing marks to correct this uncorrected time. The time signals for each secondary clock are apparently corrected separately.

Cater, in U.S. Pat. No. 3,811,265, discloses transmission of coded, time-indicating signals from a master clock at a central station to one or more slave clocks, using a two-wire line and binary-valued pulses with different time durations. A time synchronizing pulse is periodically inserted (e.g., once per second) on the line to correct for drift or other errors. If the two-wire line is a standard 60-cycle power line or a television cable, the binary-valued pulses use frequencies that lie outside the frequency range normally used on that line, to avoid signal interference with the standard signals transmitted over that line.

A clock that can be synchronized by "wireless" signals is disclosed by Gerum et al in U.S. Pat. No. 3,881,310. The clock contains an electromagnetically operated mechanical oscillator whose frequency $2f0$ is twice the rated frequency of an alternating current network connected to the clock. A time synchronization module transmits a signal of frequency $f1 \gg f0$ that is modulated by the network at $2f0$ and received and demodulated by the clock. Normally, the pulses received from the network drive the clock and the oscillator is in a standby mode. The clock oscillator is enabled, and the network is disconnected, when and only when the network frequency differs by at least a predetermined amount from the frequency $2f0$ of the oscillator. The oscillator in standby mode receives resonance energy of frequency $2f0$ from the network for maintaining the oscillations.

Chappell et al, in U.S. Pat. No. 3,941,984, discloses a satellite-aided navigation system in which location fixes of a mobile station are made at selected times. Between any two such selected times, the mobile station velocity is determined using Doppler shifts of signals received from the satellites. These velocities, measured at intermediate times, are converted to location coordinate increments and added to the location coordinates given by the last location fix to provide intermediate location coordinates between consecutive location fixes.

Cateora et al, in U.S. Pat. No. 4,014,166, disclose a satellite-controlled digital clock system for maintaining time synchronization. A coded message containing the present time and satellite position is transmitted from a ground station to an orbiting satellite and is relayed to a group of ground-based receivers. A local oscillator aboard the satellite is phase-locked to a precise frequency to provide the system with accurate time-of-year information by a count of the accumulated pulses produced by the oscillator. This count is compared with a time count determined from the coded message received by the satellite. After a selected number of errors are observed through such comparisons, the on-board clock is reset to the time indicated by the coded messages received. If transmission of the coded messages is interrupted, the on-board oscillator continues to provide time information that is transmitted to the ground-based receivers.

U.S. Pat. No. 4,042,923, issued to Merrick, discloses a trilateralization method for determination of location coordinates of a mobile station. Two stationary transceivers, each having a known location and being spaced apart, each transmit a stream of timed radar pulses having a unique code embedded therein, and these two streams are received by the mobile station. The mobile station fixes and stores its present location by determining the average distance between itself and each of the transceivers in a particular time interval of length approximately 1-1000 µsec, using triangulation. If the changes of the mobile station location coordinates are not within reasonable limits, the location fix is rejected and the last valid location fix is used.

An antenna space diversity system for TDMA communication with a satellite is disclosed by U.S. Pat. No. 4,218,654, issued to Ogawa et al. Differences of temporal lengths of paths from the satellite through each antenna to a ground-based signal processor station are determined by measurement of times required for receipt of pre-transmission bursts sent in the respective allocated time slots through two different antennas, in a round trip from base station to satellite to base station. Variable time delays are then inserted in the base station signal processing circuits to compensate for the temporal length differences for the different signal paths. These time delays are changed as the satellite position changes relative to each of the antennas.

U.S. Pat. No. 4,287,597, issued to Paynter et al, discloses receipt of coded time and date signal from two geosynchronous satellites, which signals are then converted into local date and time and displayed. The frequency spectrum is scanned by an antenna to identify and receive the satellite signals. Temporal length differences for signal paths from each satellite through a receiving antenna to a signal processing base station are determined, to provide compensation at the base station for these differences. Time information is provided by a satellite every 0.5 seconds, and this information is corrected every 30 seconds. Signals from either or both satellites are used to provide the time and date information, in normal local time and/or daylight savings local time.

Jueneman discloses an open loop TDMA communications system for spacecraft in U.S. Pat. No. 4,292,683. A spacecraft, such as a satellite, in quasi-geosynchronous orbit carries a transponder that relays a coded signal from a ground-based signal-transmitting station to a plurality of spaced apart, ground-based receivers. This coded signal includes a time index and an index indicating the spacecraft's present position. The time index is adjusted by each receiver to compensate for the changing position of the spacecraft through which the coded signal is relayed. The system is open loop and requires no feedback from the receivers to the base station.

Nard et al, in U.S. Pat. No. 4,334,314, disclose a system for radio wave transmission of time-referenced signals between two ground-based stations, with compensation for multi-path transmission timing errors. Station no. 1 has a single antenna. Station no. 2 has two antennas, spaced apart by a selected distance, to allow measurement of and compensation for multi-path transmission path length differences. A signal processor located at the receiver antenna combines a plurality of timing marks, received from the transmitting antenna along multiple paths; into a single timing mark that compensates for the multiple path length differences. This arrangement allegedly allows station-to-station transmission over distances as large as ten times the trans-horizon or direct sighting distance (which is approximately proportional to the square root of the product of antenna height and Earth's radius).

U.S. Pat. No. 4,337,463, issued to Vangen, discloses time synchronization between a master station and a remote station in which a coded message, transmitted by the master station, is received by and activates a counter in, the remote station. The remote station adds to the time value contained in the coded message the length of the message as determined by the counter and replaces the old time value by this sum. In this manner, the master and remote stations can be time synchronized.

Method and apparatus for determining the elapsed time between an initiating event and some other event are disclosed by U.S. Pat. No. 4,449,830, issued to Bulgier. A first timer and a second time mark the times of occurrence, respectively, of an initiating event and a subsequent event that depends upon occurrence of the initiating event. The two timers are initially connected and synchronized, then disconnected before the initiating event occurs. The timers are then reconnected after both events have occurred, to allow determination of the elapsed time between occurrence of the two events.

In U.S. Pat. No. 4,482,255, Gygax et al disclose a timepiece for displaying both the present time and the present orientation of the timepiece relative to the local Earth's magnetic field. The timepiece displays time, date, and the direction and angle through which the timepiece must be rotated in a tangent plane to align a fixed axis on the timepiece with the local field. The local magnetic field direction can be determined by two (static) Hall effect sensors placed at right angles to each other.

Distance ranging and time synchronization between a pair of satellites is disclosed by Schwartz in U.S. Pat. No. 4,494,211. Each satellite transmits a timing signal and receives a timing signal from the other satellite. The difference in time, including compensation for signal processing delay on a satellite, between transmission and receipt of the signals is transmitted by each satellite to the other satellite and is used to establish time synchronization and to determine the distance between the two satellites. This exchange of signals would be repeated at selected time intervals to maintain synchronization, where the satellites are moving relative to each other. No communications link to a third entity is required, and only one of the satellite clocks need be adjusted to establish and maintain time synchronization.

A portable timekeeping device that provides reminders (alarms) for taking certain actions at naturally occurring times is disclosed in U.S. Pat. No. 4,512,667, issued to Doulton et al. Means are provided for entering information on the present geographical location, and the device computes the appropriate times for taking the actions based upon the location and local time of day and year. The intended application here is for an alarm indicating the appropriate times after sunrise and before sunset for Moslem prayers. The present geographical location is entered and used together with the present time and present time of year (computed using a timekeeping device plus information stored in a ROM) to determine the appropriate times of day. A visually or audibly perceptible alarm is provided at each appropriate time of the day.

In U.S. Pat. No. 4,543,657, Wilkinson discloses a system for synchronizing two clocks by transmission of a single pseudo-random number (PRN) that is an unbroken stream of bits by a master clock. At any point in time, the accumulated partial bit stream represents a unique time of day. One bit of the number is transmitted every 10 msec, and the bit stream recycles every 24 hours. The total coded signal for 24 hours is thus 8,640,000 bits long, and the time resolution is 5 msec. The partial bit stream is received and decoded by a receiver and applied to synchronize a remote clock associated with this receiver. In order to compensate for signal propagation time between the clocks, it appears that the distance between the master and remote clocks would have to be known and fixed. An earlier U.S. Pat. No. 3,852,534, issued to Tilk, discloses a method for maintaining synchronization between two pseudorandom number generators at spaced apart locations, using a common time generating source. The times for signal propagation between the two generators may vary.

Plangger et al, in U.S. Pat. No. 4,582,434, disclose transmission and receipt of a continuously corrected single sequence of timing signals. A microprocessor at the receiver periodically compares these timing signals with on-board timing signals generated by a local clock. A varactor diode in a crystal oscillator circuit is adjusted to adjust the microprocessor's operating frequency to minimize any error between the two timing signal sequences. Timing signal processing delay time is compensated for in a receiver circuit. The frequency for microprocessor operation is continuously corrected. If the transmitted timing signals are too weak or do not arrive, the on-board timing signals control the microprocessor until the transmitted timing signals are received in sufficient strength again.

A remote time calibration system using a satellite is disclosed in U.S. Pat. No. 4,607,257, issued to Noguchi. A base station provides a referenced system of absolute timing signals and transmits these to a satellite that orbits the Earth. The satellite then calibrates and periodically adjusts its internally generated time and transmits observed data plus the corresponding adjusted satellite time to one or more data receiving stations on the Earth that are distinct from the base station. Time calibration optionally compensates for signal propagation time delay from base station to satellite and allows continuous transmission of data from satellite to the data receiving station(s). Several time difference indicia are computed here.

Olsen et al, in U.S. Pat. No. 4,814,711, disclose a real time geophysical survey system including four or more GPS satellites, a fixed base station on the ground, and one or more GPS data acquisition vehicles that communicate with the central station and that receive GPS signals from the satellites. Each vehicle determines its approximate horizontal location, and the central station transmits signals to guide each vehicle along a selected pattern for purposes of collecting survey data. Periodically, the survey data are transmitted by each vehicle to the central station for analysis, display and/or storage, using time-synchronized signals.

A system for obtaining orbital data from GPS satellites is disclosed by Counselman, in U.S. Pat. No. 4,912,475. Satellite signals are received by three or more spaced apart, fixed ground stations that form a network of baselines between these stations. The ratio of maximum baseline length to minimum baseline length is much greater than 1. From the satellite signals received at each pair of base stations, certain double-differenced carrier phase measurements are formed and used to determine the location of a mobile GPS station in the vicinity of the base stations.

U.S. Pat. No. 5,001,730, issued to Franaszek et at, discloses a clock synchronization algorithm useful for address-independent networks, such as token buses and token rings. The fastest clock in the network is identified as the master clock for subsequent synchronization. Each node with a clock broadcasts its time when a counter reaches a selected number. If, before a node broadcasts its own time, that node receives a time from a second node that is higher than its own time, the first node concludes that the second node has a faster clock and does not broadcast its own time. After a few cycles of time counting and broadcasting, only the node with the fastest clock remains.

U.S. Pat. No. 5,099,245, issued to Sagey, discloses an airborne vehicle location system that uses one or more satellites and three or more spaced apart base stations with fixed, known locations on the ground to determine the location of the vehicle. Signals are transmitted by the vehicle to the base stations, to the satellite, and relayed by the satellite (acting as a "bent pipe" transponder) to a separate central station. The distance of each base station from the airborne vehicle is determined by relative time delays for arrival of these signals at the central station, and these distances determine the location of the airborne vehicle.

Morales-Garza discloses a wide area, real time television audience response system, using satellite signal relaying, in U.S. Pat. Nos. 5,101,267 and 5,223,923. Local area stations collect the audience responses from their respective local areas. Each local area station transmits its collected responses in one or more assigned, non-overlapping time slots to a satellite that relays this information to a central data center. The responses are transmitted as pulses of a single frequency so that the transmission channel bandwidths are kept relatively small.

A system for determining the location of a mobile station, using two or more signal relay satellites with known locations and a base station on the ground is disclosed by Toriyama, in U.S. Pat. No. 5,111,209. The mobile station transmits an initiating signal to a first satellite, and this signal is relayed to the base station. The signal is than transmitted simultaneously to the first and second satellites, which relay this signal to the mobile station. The location of the mobile station is determined by the relative times at which these relayed signals from the two satellites are received by the mobile station.

A method of synchronizing time in a wide area network without using a master or global clock is disclosed by Flammer in U.S. Pat. No. 5,130,987. A frequency hopping band plan, known by every node, is implemented, and each network node establishes a time offset for each hop band for every other node. The known hop timing offsets for each node are used to synchronize the times for all nodes. Frequency hopping is implemented, in part, by assignment of time slots to collections of hop bands.

In U.S. Pat. No. 5,138,631, Taylor discloses a satellite communication network having a central station and a plurality of subsidiary stations, all ground-based. An inbound message from a satellite carries packets encoded in CDMA code, indicating the intended destination. The central station receives these messages and transmits the messages to the appropriate subsidiary stations, using TDMA coding, at a faster bit rate. The central station may serve several groups of subsidiary stations, each using a different CDMA code.

Spradley et al, in U.S. Pat. No. 5,155,490, disclose a geodetic survey system using four or more GPS satellites and three or more GPS base stations with fixed, known locations on the ground. Clock drift and clock offset for a clock in each of the network of base stations is determined and compensated for by time averaging. A mobile station receives location—determining signals from each of the network of base stations and thereby determines its location, by post-processing or by activities that approximate real time processing.

Penrod, in U.S. Pat. No. 5,220,333, discloses a method for synchronizing a given clock time to Universal Coordinated Time (UTC) from a sequence of LORAN-C signal transmissions. The time must be initially accurate to within 100 msec of UTC, and the location of the clock must. be initially known to within 5 miles. The system then resynchronizes this time to UTC, accurate to within a few msec, by identifying the correct LORAN-C time cycle and compensating approximately for receiver time delay and signal propagation time delay. Use of UTC to provide accurate time in a GPS environment is disclosed by Desai et al in U.S. Pat. No. 5,319,374.

A vehicle tracking with a GPS antenna and receiver and transmitter mounted on the vehicle is disclosed in U.S. Pat. No. 5,225,842, issued to Brown et al. The GPS receiver measures the pseudoranges for the incoming signals and transmits this information, unprocessed, to a selected workstation for processing and determination of any differential GPS corrections to be applied to the vehicle present location. The vehicle is assumed to travel on a two-dimensional surface whose geometrical description is known by the workstation.

U.S. Pat. No. 5,235,633, issued to Dennison et al, discloses provision of a cellular telephone network in which each cellphone unit has a GPS signal antenna and receiver attached. The cellphone unit periodically advises a Mobile Telephone Switching Office of the unit's present location. When a particular cellphone unit is to be reached by an incoming phone call, the MTSO uses the last-reported cellphone location to determine which cellular region to use for completing the phone call link.

A multiple unit tracking system that uses Loran for monitoring the location of a plurality of mobile stations, such as ships at sea or aircraft, is disclosed by Stanifer et al in U.S. Pat. No. 5,243,530. Each mobile station carries a Loran-based location determination receiver, determines its own location, and periodically transmits this location information to a base station using relay stations as intermediaries by packet radio techniques.

In U.S. Pat. No. 5,245,634, Averbuch discloses a backup time synchronization system that can be used if GPS-based time synchronization is lost in a network. The network includes a central station and a plurality of remote stations whose clock times are synchronized by the back-up system, using COMA cellular radiotelephone links. The communication links use T1, JT1, CEPT or microwave, with the uncontrolled time delays in a link being approximately determined by an algorithm that accounts for link distance, time delay for signal relay and processing, and receiver temperature effects.

Use of a network of seismic sensors, each positioned using a GPS signal receiver/processor, to receive and hold signal information generated in a controlled seismic experiment, is disclosed by Rialan et al in U.S. Pat. No. 5,276,655. Periodically, such as once per day, the sensor information is downloaded to a central station.

Mueller et al disclose a networked differential GPS system in U.S. Pat. No. 5,323,322. An absolute pseudorange correction (PRC) is defined for each satellite as a function of the observer's location, and iso-PRC contours are determined for each such satellite. PRC values are interpolated for locations between two adjacent iso-PRC curves.

In U.S. Pat. No. 5,363,447, Dennis discloses a navigation system in which GPS signals are received at each of a network of GPS reference stations with known locations. GPS correction information is generated, and this correction information is broadcast for use by a remote GPS user, for correction of the remote user's computed location.

A GPS-based tracking system for radiosondes, sonobuoys and the like is disclosed by Brown et al in U.S. Pat. No. 5,379,224. Samples of incoming GPS signals are received at a sensor and placed in a data buffer. This sampled data is interleaved with other data and sent over a data telemetry link to a processing workstation, at a rate lower than the rate at which the GPS signals are received. These data are processed at the workstation, and differential corrections are periodically provided by the workstation for the calculated location and velocity of the sensor.

Fernandes et al, in U.S. Pat. No. 5,379,320, disclose a satellite communications network including a hub terminal and several mobile terminals, wherein a GPS signal receiver/processor located on each mobile terminal provides time and frequency references for rapid signal acquisition. The remote terminals transmit data individually or in blocks to the hub terminal, using orthogonally-coded signals.

A GPS-based portable locating system is disclosed in U.S. Pat. No. 5,389,934, issued to Kass. One or more mobile portable units each carries a GPS signal antenna and receiver to determine the unit's present location, a voice synthesizer to convert this location information to voice form, and a cellular telephone to transmit the present location information in voice form to a selected data collection entity.

U.S. Pat. No. 5,390,124, issued to Kyrtsos discloses a system for measuring pseudoranges from GPS signals received, computing nonlinear errors in the pseudorange measurements, and removing these errors in subsequent computations of present location of a mobile GPS user. The GPS signals received and used may be uncorrected or differentially corrected.

The approaches disclosed in these references generally: (1) assume that the location of each timing signal recipient is known precisely, or (2) usually provide approximate timing signals and/or location signals that are, at best, accurate to within tens of microseconds or (equivalently) tens of kilometers, or (3) do not provide real time signals with high accuracy for synchronization or location determination. What is needed is a system that provides real time signals for timing synchronization and/or location determination that have associated inaccuracies of at most a few tenths of a nanosecond (or 1-3 cm, equivalently). Preferably, the system should allow a timing signal or location signal recipient to use the invention anywhere in the world and should allow rapid determination of corrections of measurements taken from signals received from satellites or ground-based sources. Preferably, the system should allow quantitative determination of the contributions of different error sources to the pseudorange corrections. Preferably, the system should be able to support several formats for reporting location and velocity parameters and should not require use of data links that require high signal update rates (e.g., every ten milliseconds). Preferably, the system should allow use of carrier phase information to enhance the accuracy of velocity coordinate information.

SUMMARY OF THE INVENTION

The invention meets this need by providing three or more fixed Global Positioning System (GPS) signal antennas and associated receiver/processors, referred to as GPS reference stations, with known locations, that receive and analyze GPS signals from each of three or more GPS satellites, using certain approximations to extend the pseudorange and/or pseudorange rate corrections to a much larger region S. The GPS may be replaced by a Global Orbiting Navigational Satellite System (GLONASS) or any similar satellite-based Satellite Positioning System (SATPS) for location determination; these are discussed in detail below. These GPS reference stations may be positioned at or near the boundary of S and/or may be positioned throughout the interior of S as well. Each reference station determines the pseudorange corrections for GPS at its location and transmits this information as one or more packets in RTCM SC-104 format to a central station. Alternatively, the reference station does at most part of the signal processing and transmits the partly processed or unprocessed pseudorange, pseudorange rate and/or carrier phase information in packets to the central station for subsequent signal processing. Each packet from a reference station includes a station id. and includes a parameter indicating the present status of that reference station. This may include RTCM messages of types 1, 2, 3, 5, 6, 7, 9, 16 and/or proprietary formats that are part of new message type 59.

The central station concatenates the packets into a binary stream that is fed to a Trimble Net 4000 or equivalent GPS signal processor to determine GPS pseudorange and/or pseudorange rate and/or carrier phase correction parameters or information from which location and/or velocity coordinates can be calculated with no more than a specified inaccuracy over the entire region S, with maximum inaccuracies that can be reduced in size by use of more complex approximations. The central station then broadcasts a GPS pseudorange and/or carrier phase correction message that can be received and used by all mobile GPS stations within the region S, which may include the entire Earth if desired.

The central station broadcasts a correction message that would be provided by a reference GPS station, called a virtual reference station (VRS) here, located at a selected site, or a plurality of such selected sites, in the region S. The location chosen for the VRS need not be, but may be, the site of an actual or physical reference station. Any mobile SATPS station that is near a VRS location can use this correction message broadcast by the central station as if the message were broadcast by a reference GPS station located at the virtual station site. This VRS will normally provide its correction signals in an RTCM format and in any other appropriate format that is requested. The central station, acting as if it is a VRS, can translate these correction message into another format that can be used more conveniently by a surveyor or navigator operating near the VRS site but need not receive and process GPS signals from the satellites. The invention sup-

DETAILED DESCRIPTION OF BEST MODES OF THE INVENTION

Figure 1:
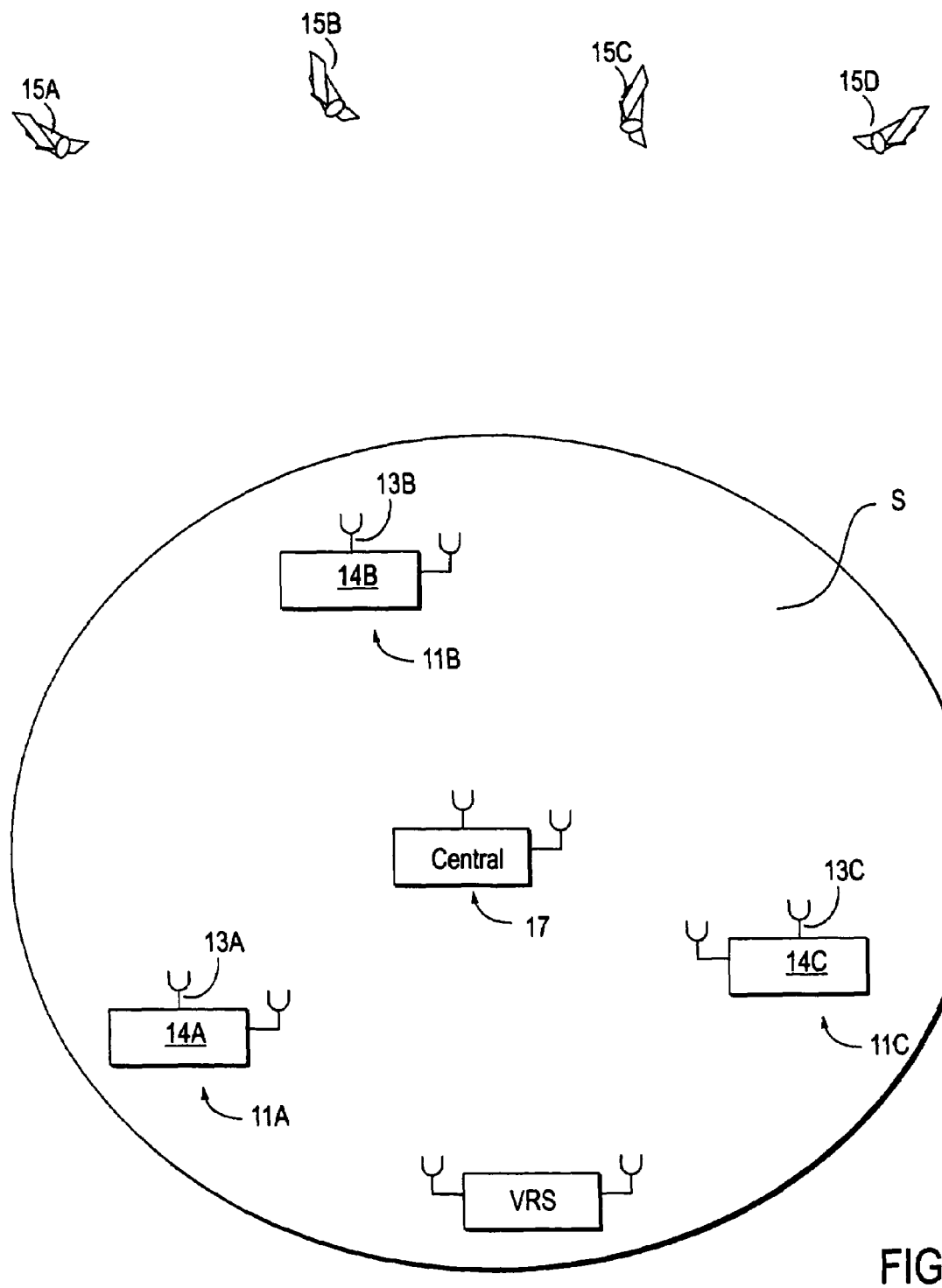
FIG. 1 illustrates an environment in which the invention is used.

FIG. 1 illustrates use of the invention to cover a large region S, which may extend over the entire Earth or may have a smaller diameter. Each of three or more GPS reference stations 11A, 11B, 11C, with GPS signal antennas 13A, 13B, 13C, and receiver/processors 14A, 14B, 14C receives GPS signals, including pseudorange information, from several common-view GPS satellites 15A, 15B, 15C, 15D. A common-view" satellite is visible from the sites of at least three reference stations at the same observation times. The location coordinates of each of the reference stations 11A, etc. is known with high accuracy, either by use of a surveyor by some other means. As each reference station 11A, 11B, 11C, receives the GPS signals from each of the GPS satellites 15A, 15B, 15C, the GPS-determined pseudorange for the GPS antenna for that station and that satellite is compared with a calculated pseudorange for that station and that satellite, and GPS pseudorange corrections PRC(t;t0;m;n) are generated corresponding to each GPS satellite (m=1, 2, 3, 4, . . . ) at each reference station (n=1, 2, 3, . . . ).

Pseudorange is a time offset, or equivalent spatial offset, that must be applied to a GPS signal receiver's clock to create a time-based P-code or C/A-code to achieve maximum cross-correlation with a corresponding code received from a GPS satellite being tracked. The calculated pseudorange PR(t;t0; m;n) and RTCM-formatted pseudorange correction PRC(t; t0;m;n), valid for times t>t0 and near t=t0, for a given GPS satellite (m) and a given GPS signal receiver/processor (location n) are described by the relations $$PR(t;t0;m;n)=R_{us}(t;t0;m;n)+\varnothing_u(t;t0;n)\,\varnothing_s(t;t0;m)+\delta I(t;t0;m;n)+\delta T(t;t0;m;n)+\delta e(t;t0;m;n), \quad (1)$$

$$PRC(t;t0;m;n)=R_{us}*(t;t0;m;n)-\varnothing_S*(t;t0;m)-PR_{meas}(t;t0;m;n), \quad (2)$$

$$R_{us}*(t;t0;m;n)=R_{us}*(t;t0;m;n)+\epsilon R_{us}(t;t0;m;n), \quad (3)$$

$$\varnothing_S*(t;t0;m)=\varnothing_S*(t;t0;m)+\epsilon\varnothing_S*(t;t0;m), \quad (4)$$

$$PR_{meas}(t;t0;m;n)=PR_{meas}(t;t0;m;n)+\epsilon PR_{meas}(t;t0;m;n), \quad (5)$$

Here: $R_{us}*$ is the calculated range from the reference station (n) to the satellite (m); $R_u$ and $\epsilon R_{us}$ are the true range and error in calculated range, respectively; $\varnothing_S*$ is the calculated offset of the satellite clock with respect to GPS time (multiplied by the velocity of light in vacuum, c); $\varnothing_S$ and $\epsilon\varnothing_S$ are the true clock offset and error in calculated clock offset, respectively; $\varnothing_u$ is the offset of the GPS receiver/processor clock with respect to GPS time; $PR_{meas}$ and $\epsilon PR_{meas}$ are the measured pseudorange and error in measured pseudorange, respectively; $\delta I(t;t0;m;n)$ is the signal propagation time delay with respect to free space propagation contributed by the ionosphere; $\delta T(t;t0;m;n)$ is the signal propagation time delay with respect to free space propagation contributed by the troposphere; and $\delta e$ represents residual errors, including multipath, in the pseudorange. Each of the quantities in Eqs. (1)-(5) will vary with time t and will depend upon the GPS receiver/processor chosen (n; often referred to as simply a GPS "receiver" for convenience) and/or choice of GPS satellite (m).

Carrier phase is the time integral of a frequency offset $\delta\omega$ (multiplied by the GPS carrier signal wavelength $\lambda$) that is applied to the GPS receiver's replica GPS signal to maintain phase lock with the carrier of the signal received from a GPS satellite that is being tracked. The propagation velocity c of electromagnetic waves in a vacuum can be used to convert between times and equivalent distances in Eqs. (1)-(5).

Equations (2)-(5) can be combined to yield the relation $$\begin{aligned}PRC(t;t0;m;n) &= \\ R_{us}*(t;t0;m;n)&-\varnothing_S*(t;t0;m)-PR_{meas}(t;t0;m;n) \\ =\epsilon R_{us}(t;t0;m;n)&-\epsilon\varnothing_s(t;t0;m)-\varnothing_U(t;t0;n)-\delta I(t;t0;m;n)- \\ \delta T(t;t0;m;n)&-\delta e(t;t0;m;n)ePR\,PR_{meas}(t;t0;m;n).\end{aligned} \quad (6)$$

In a GPS network, the terms $\varnothing_U$ and $\delta e$ can be combined in a common offset $\varnothing$net' of network time with respect to GPS time. The pseudorange correction PRC, as determined by a network, can be written as $$PRC(t;t0;m;n)=\epsilon R_{us}(t;t0;m;n)-\epsilon\varnothing_S'(t;t0;m)\varnothing\text{net}'(t;t0;m;n)-\delta I'(t;t0;m;n)-\delta T(t;t0;m;n), \quad (7)$$

where a prime on a variable on the right hand side indicates that the variable is to be determined with reference to a selected network reference point rather than to a user location.

Selective Availability (SA) induces errors in range and range rate calculations by dithering the clock that controls the carrier frequency and the code broadcast by a satellite, and by falsifying clock and ephemeris information being broadcast to allow calculation of the location and clock error of a satellite. The dither effects can change significantly in a few seconds, but the ephemeris information changes only with hourly page changes. Clock dither and errors in the broadcast clock parameters affect all observers equally. Compensation for these terms can be combined into a single range term and a single range rate term for each satellite. These compensation terms can be broadcast to all observers at a rate of approximately once per second. Errors in the ephemeris produce slowly varying errors in calculated range. Compensation for these errors can be transmitted effectively as offsets for the calculated location of the satellite.

When the satellite clock is dithered by activation of Selective Availability, the term $\epsilon\varnothing_S'$ varies much more rapidly with time than do the other variables on the right hand side of Eq. (7). Because of the presence of this term, an RTCM Type 1 message must be broadcast frequently, (for example, once per second or more often) so that the pseudorange collection terms PRC can provide effective collection for the clock dither. If the term $\epsilon\varnothing_S'$ is somehow removed, the required rate for update signals falls to a rate of the order of once per minute or lower. If a new variable $$F_{noclock}(t; t0; m; n) = PRC(t; t0; m; n) + \epsilon \emptyset'_s(t; t0; m) \quad (8)$$
$$= \epsilon R_{us}(t; t0; m; n) - \emptyset net'(t; t0; m; n) -$$
$$\delta I'(t; t0; m; n) - \delta T(t; t0; m; n),$$

is formed, this new variable can be transmitted at the lower rate, because none of the terms on the right in Eq. (8) varies rapidly with SA-induced clock dither. A global network GPS user can obtain the high update rate PRC term from an RTCM Type 1 PRC message (automatically updated at relatively high rates) and can calculate the high-rate clock correction term from the relation $$\epsilon \emptyset_S'(t;t0;m) = F_{noclock}(t;t0;m;n) - PRC(t;t0;m;n). \quad (9)$$

The only additional term that need be sent for clock correction purposes here is $F_{noclock}$, and this occurs at the more leisurely rate. This approach is thus more efficient than the conventional approach, which would require transmission of the separate or additional term $\epsilon \emptyset_S'$. The elevation angle of a satellite, viewed from the network reference point, may be too low for use by a navigator operating with the standard RTCM output signals from the network. In this event, the network may implicitly assign the term $F_{noclock}$ the value 0 and set $$PRC(t;t0;m;n) = -\epsilon \emptyset_S'(t;t0;m). \quad (10)$$

Each GPS satellite broadcasts a navigation message containing parameters from which the satellite's clock error and its location can be computed. The computed clock error and position of the satellite are used together with measured or modelled values for the tropospheric and ionospheric time delays to transform Eq. (1) into a function of the user's antenna location and clock error. The difference between the measured pseudorange and the calculated pseudorange defined by Eq. (1) is an equation in four unknown variables: three components of the user antenna spatial location and the clock error of the user's receiver/processor. Simultaneous measurements for each of four or more satellites produce a set of four or more equations to be solved for these four unknown variables. A complete solution for the pseudorange is given in Appendix A of "Reference Trajectories from GPS Measurements", James E. Robbins, Navigation, Journal of the Institute of Navigation, vol. 35 (1988) pp. 89-103. Approximate values of the user's spatial coordinates and clock error are often used to linearize the resulting four equations and to determine perturbations around these approximate solutions that satisfy the four equations. Errors in the parameters of a satellite navigation message and errors in the tropospheric and ionospheric time delays produce errors in the user's location and clock offset, as derived from this process.

The difference between measured pseudorange at a reference station and calculated pseudorange from Eq. (1), using the known spatial coordinates of the reference station, is manifested by a composite measurement error in the calculated pseudorange caused by parameter errors in the satellite navigation message, and by errors in compensation for the tropospheric and ionospheric time delays. Differential GPS computation is implemented by distributing corrections for these navigation message errors to users who apply such corrections to the measured/calculated pseudorange differences before the user spatial coordinates are determined. Differential GPS correction is discussed below.

Differential corrections are obtained as differences between GPS measurements and estimates of the corresponding quantities, calculated from known or modelled values for the elements. A mobile GPS station near a GPS reference station can use the pseudorange or carrier phase correction applicable at that reference station to modify or correct its own pseudorange or carrier phase equations to compute more accurate spatial location and time coordinates. However, the DGPS corrections for a GPS reference station become less and less accurate for the GPS mobile station as the distance between the mobile station and the reference station increases and become substantial at distances of 200 km or more (for pseudoranges) and at distances of 30 km or more (for carrier phases). This degradation in accuracy with increase in distance from a GPS reference station arises in large part because the tropospheric and ionospheric paths differ for GPS signal propagation from a given satellite to the reference station and to the mobile station, and because of the different aspect angles for line of sight from the reference station and from the mobile station to that satellite.

Pseudorange corrections and/or carrier phase corrections may take account of errors due to satellite clock errors, receiver clock errors, ionospheric and tropospheric propagation time delays, and other errors, not including errors due to the presence of multipath signals and certain other error sources. These GPS pseudorange corrections PRC(t;t0;m;n) or unprocessed measurements are transmitted by each reference station to a central processing station 17 for amalgamation and reconciliation of these corrections for the same satellite (m) for all reference stations (n).

In the format defined by the RTCM SC-104 standards, the tropospheric and ionospheric propagation time delays are not modelled so that the pseudorange corrections must compensate for the total effects of these time delays.

Where the same models for tropospheric time delays and ionospheric time delays are used for the reference station and for the mobile station, the contributions to pseudorange and/or carrier phase errors of each of these time delays become smaller, because these contributions arise only from differences between the actual and the modelled time delays. Use of pseudorange and/or carrier phase corrections for a GPS mobile station, based on these corrections at a GPS reference station, may have acceptable accuracy for mobile station-reference station separation distances of several hundred kilometers.

Figure 2A:
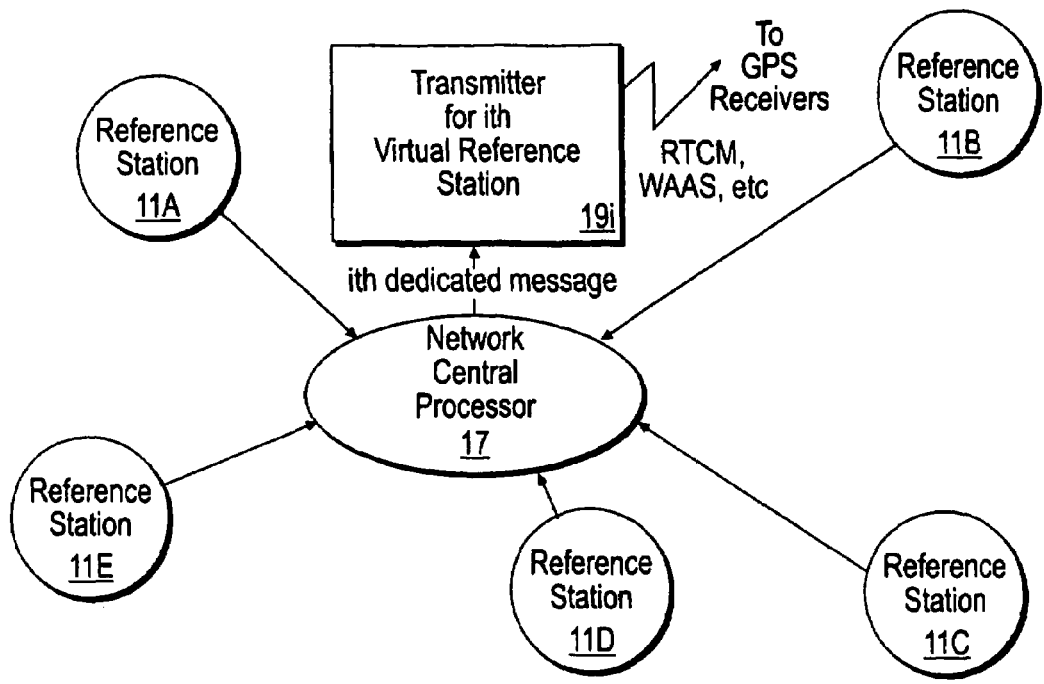
FIGS. 2A, 2B and 4 illustrate use of a virtual reference station in a dedicated mode, an ad hoc (possible mobile) mode and a survey mode.

A virtual reference station (VRS) that converts a network-adopted format to a standardized (or more convenient) format and rebroadcasts the signals in this standardized format, can be implemented at the network central station, at a remote GPS station, or at a local unit that moves with the user. A VRS implemented at the network central station may be appropriate for a network that feeds a plurality of dedicated VRSs whose locations are fixed, such as airports, FM radio stations, government service buildings, etc. This configuration requires transmission of the correction information from the network central station to each (re)broadcasting source (a VRS or its stand-in). FIG. 2A illustrates this situation, using a dedicated channel that may be shared by several VRSs 19i (i=1, 2, ... ).

Figure 2B:
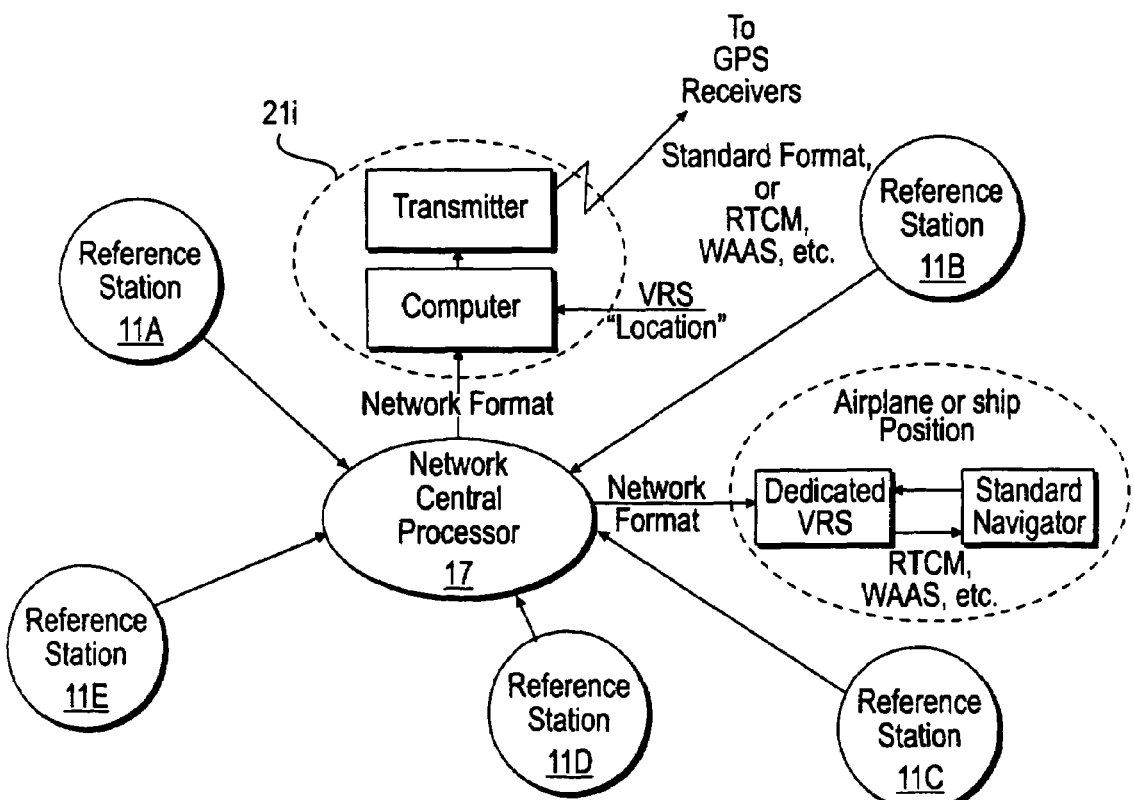

A plurality of VRSs 21i (FIG. 2B) implemented at locations remote or spaced apart from the network central station can provide a framework for ad hoc VRSs and for moving and/or stationary VRSs. General DGPS correction messages broadcast by the network central station are received and rebroadcast (in a translated format, if appropriate) by a remote VRS 21i for use by any GPS user within a selected distance from that remote VRS (a "local user"). Each remote VRS 21i may serve one or many local users that are sufficiently close to that VRS that the DGPS corrections broadcast by the VRS can be used as if the local user were located at that VRS site.

A VRS knows its own present location, either by use of a permanent file containing such information for a stationary VRS, or by use of continually updated VRS location information for a moving VRS. The VRS calculates the (changing) location of a satellite from satellite ephemeris information received from the network central station.

One approach for calculation of the VRS location data uses a format appropriate for global or unlimited area GPS networks. The satellite clock offset and the receiver clock offset vary temporally, but not with location of the receiver. The spatially varying portion of a total pseudorange correction TPRC is expressed as a sum of three components, which are computed individually in a global format, to compensate for (1) errors in the computed satellite location, (2) errors in estimated tropospheric time delays and (3) errors in estimated ionospheric time delays. This approach relies on real time calculation of the components of a three-dimensional SAT error vector from the computed satellite location to the actual satellite location, as a function of time. This approach contrasts with the conventional approach of using reference station measurements to calculate the GPS satellite ephemerides from first principles, as is done in the GPS Control Segment.

Tropospheric time delay is modelled using a non-proprietary model based on exponential decay of the zenith component of this delay with increasing altitude. Tropospheric time delay is modelled by dividing the zenith component by the sine of the satellite elevation angle, measured at the ! GPS station location. This model provides a global format.

Ionospheric time delay is computed using a single-frequency model for GPS. This model is summarized in the Navstar Interface Control Document, ICD-GPS-200, published by Rockwell International Corporation, Satellite Division, Revision B, 3 Jul. 1991, the material from which is incorporated by reference herein, and the required parameters for this model are broadcast by the GPS satellites. Reference station measurements of ionospheric time delay may be used to calculate improved values of these model parameters, which are then distributed by the network. A single frequency GPS station can use the single frequency model, with parameters supplied by the GPS satellites or by the network. A double frequency GPS station can use this single frequency model, or the station can measure and determine the ionospheric time delay using a two-frequency model, such as that disclosed in the ICD-GPS-200 document, op cit.

After the tropospheric and ionospheric time delays have been compensated for, the spatially varying portions of the pseudorange corrections from each reference station are Kalman filtered to estimate components of the SAT vector. Mutually perpendicular radial, down-plane and cross-plane vector components can be computed, and the vector can be transformed to Earth-centered, Earth-fixed (ECEF) coordinates for distribution to the GPS mobile stations, if desired.

A GPS mobile station may determine the components of a unit vector that points from the mobile station to each of the GPS satellites. The scalar or dot product of this unit vector with the SAT vector produces the component of pseudorange correction required to compensate for satellite location error at the mobile station location. Use of the global ECEF coordinates for satellite location correction, a common clock correction model and the global formats of the tropospheric and ionospheric time delays provides a global format for computing and distributing parameters used for pseudorange corrections at any location. This format is appropriate for regional networks of unlimited area; that is, the network may cover the Earth and some regions of space near the Earth's surface, if desired.

Satellite location is included in the pseudorange and pseudorange correction computations in Eqs. (1)-(2), through the range term $R_{us}$ that denotes the range from the user antenna to the satellite antenna. More specifically, the range term is written as $$R_{us} = r_{user} - r_{sat} = r_{us}, \quad (11)$$

$$r_{sat} = \text{location vector to satellite antenna}, \quad (12)$$

$$r_{user} = \text{location vector to user antenna}. \quad (13)$$

An error $\epsilon r_{sat}$ in the calculated satellite location produces a corresponding error in the range term R*, given by $$(R_{us}^*)^2 = (R_{us} + \epsilon R_{us})^2 = r_{sat} + \epsilon r_{sat} - r_{user}^2 = R_{us}^2 + 2\epsilon r_{sat} \cdot r_{us} + \epsilon r_{sat}^2, \quad (14)$$

$$\epsilon R_{us} = \epsilon r_{sat} e_{us} + [\epsilon r_{sat}2 - (\epsilon R)^2]/2R_{us} \epsilon r_{sat} e_{us} \quad (15)$$

$$e_{us} = r_{us}/r_{us} = \text{unit length vector from user to satellite}. \quad (16)$$

Figure 3:
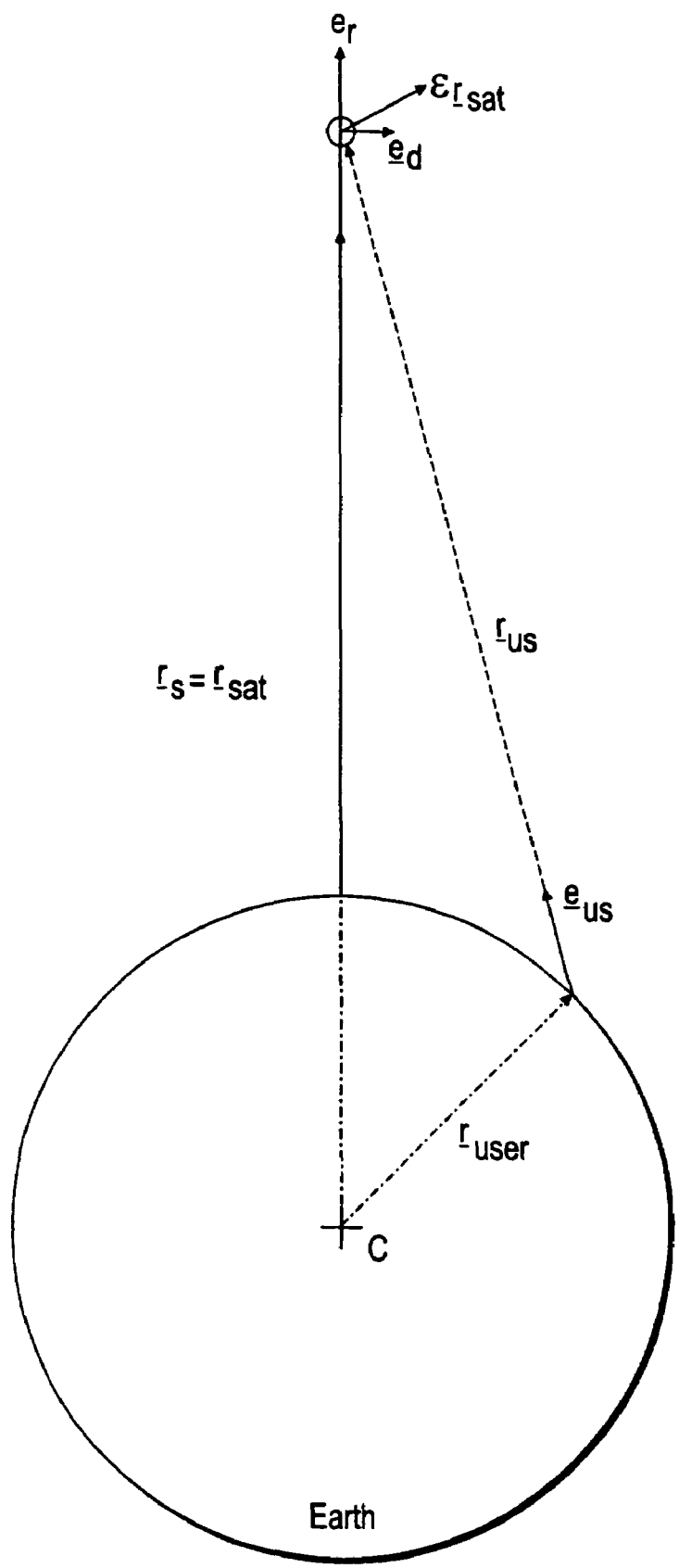
FIG. 3 illustrates vectors used to analyze the user-satellite range error in a navigation mode.

FIG. 3, which is not drawn to scale, illustrates the vector and scalar relationships of these quantities, showing the components of the satellite range error $\epsilon r_{sat}$ in the radial direction ($e_r$) and in an orthogonal plane defined by the down-plane and cross-plane directions ($e_d$ and $e_c$).

The satellite location error vector $\epsilon r_{sat}$ can be determined by the central station as follows. Satellite location $r_{sat}$ is determined using the almanac or ephemeris information, as set forth in the document Navstar GPS Interface Control Document, ICD-GPS-200, op. cit., in an ECEF coordinate system. These coordinates are then converted to an orbital coordinate system with the relations $$r_{sat} = x_{sat} e_x + y_{sat} e_y + z_{sat} e_z, \quad (17)$$

$$e_x = e_y = e_z = 1, \quad (18)$$

$$e_r = r_{sat}/r_{sat}, \quad (19)$$

$$e_d = [er(t+t) - e_r(t-t)]/e_r(t+t) - e_r(t-t), \quad (20)$$

$$e_c = e_d \times e_r, \quad (21)$$

where $e_r$, $e_d$ and $e_c$ are unit vectors in the radial (from the Earth's center), down-plane and cross-plane directions, respectively. Alternatively, the down-plane vector $e_d$ is determined by the relation $$e_d = (d/dt)e_r/(d/dt)e_r \quad (22)$$

The cross-plane vector $e_c$ is determined by the relation $$e_c = e_r \times e_d \quad (23)$$

The error vector to be estimated, $\epsilon r_{sat}$, is expressed in orbital coordinates as $$\epsilon r_{sat} = \epsilon_r e_r = \epsilon_d e_d + \epsilon_c e_c \quad (24)$$

A more general Cartesian coordinate system, defined by three orthogonal (or linearly independent) unit length vectors ($e_1$, $e_2$, $e_3$), can be used to express the satellite location error $\epsilon r_{sat}$ in Eq. (24). However, use of the radial coordinate system defined by the three unit length vectors ($e_r$, $e_d$, $e_c$) often allows use of measurements from only three reference stations, rather than from four or more such stations, to determine the satellite location error $\epsilon r_{sat}$. If this radial coordinate system is used, and if measurements from M 4 reference stations are available, the measurements of M-3 of these reference stations can be used for consistency checks on the measurements from three reference stations that are used to determine the satellite location error $\epsilon r_{sat}$.

The components of $\epsilon r_{sat}$ can change erratically only at times when the navigation message changes; a satellite does not jump around in space. Jumps in satellite clock error and in satellite location that are associated with changes in the navigation message can be calculated explicitly by repeating the calculations using the old set and the new set of parameters. Changes in the components of the vector $\epsilon r_{sat}$ are benign in a coordinate system with unit vectors oriented along the radial direction $r_{sat}$, down-plane direction and cross-plane direction of the satellite orbit, (referred to herein as the "orbital coordinate system"). Thus, a Kalman filter, running on the satellite clock error and on components of the error vector $\epsilon r_{sat}$ in this system, with deterministic state changes calculated when the navigation message changes, can operate effectively with fewer than four simultaneous measurements. Further, the spatial location components can survive occasional lapses, for a moderate time interval, in satellite tracking. A transformation from an Earth-centered, Earth-fixed (ECEF) coordinate system to the instantaneous orbital coordinate system can be calculated from information in the satellite ephemerides or in the satellite almanacs broadcast by the GPS satellites in the navigation messages. For distribution to users, the components of $\epsilon r_{sat}$ are retransformed to the ECEF.

Each VRS computes its VRS-to-satellite unit vector $e_{us}$, using ephemeris information from the network and the known VRS location, and forms the scalar product $e_{us} \cdot \epsilon r_{sat} \approx \epsilon R_{us}$ to determine the component of range error $\epsilon R_{us}$ at the VRS location due to satellite location error. Because the correction vector $\epsilon r_{sat}$ varies slowly, the message containing this part of the pseudorange correction can be sent less frequently than other parts of the message. The satellite location correction message must contain an issue of data ephemeris (iode) label to relate this to the iode of the satellite navigation message so that users can properly use the corrections. Corrections for the satellite clock error, to compensate for SA clock dither and other disturbances, must be transmitted rapidly.

In the RTCM format, the Type 1 or Type 9 messages carry the clock corrections, combined in the pseudorange correction with location-dependent corrections for the location transmitted in a Type 3 message. The VRS uses these messages and the term $F_{noclock}$ extracted from auxiliary messages to calculate the satellite clock error value $\epsilon \varnothing_S$ in Eq. (9). If the network is not restricted according by the RTCM format PRC requirements, the satellite clock error value $\epsilon \varnothing_S$ can be transmitted directly and the auxiliary message term $F_{noclock}$ is not used.

The azimuth angle A and the elevation angle E for a satellite are used in calculations of the ionospheric and tropospheric time delays. The VRS can calculate these angles using the vector $e_{us}$. The unit length vector $e_{us}$ is expressible in a local (east, north, up) coordinate system as $$e_{us} = e_{east} \cos E \sin A + e_{north} \cos E \cos A + e_{up} \sin E. \quad (25)$$

The tropospheric time delay $\delta T$ for signal propagation from the satellite to the VRS location is calculated by the same model that is used for the network central station, which is $$\delta T(t;t0;m;n) = \delta T_0 \exp(-h_u/h_s) \csc E, \quad (26)$$

where $h_u$ is the altitude of the VRS location and $\delta T_0$ and $h_S$ are model parameters. These model parameters can be constants or may be time-varying variables obtained from the network central station.

The ionospheric time delay for signal propagation from the satellite to the VRS location is calculated using the same model that is used for the network central station. A Type 59 RTCM message may be used, together with the model for single frequency users set forth in Section 2.4.4.3 Ionospheric Model, Global Positioning System Standard Positioning Service, OASD (C31)/T&TC3, 6000, Defense Pentagon, Washington, D.C. 20301-6000, incorporated by reference herein. The RTCM Type 59 message broadcast by the network central station for the ionospheric time delay model contains a set of the four alpha parameters and the four beta parameters used in the model, plus an additional term to be applied for time delay in the vertical direction ("up" in Eq. (25)) before the obliquity calculation is performed. Additional time data are used to augment the RTCM time tag to provide both time of day and date. The VRS location, satellite location, satellite azimuth and elevation relative to the VRS location, the time of day and the extended model parameters for the ionospheric time delay model are then used to compute the ionospheric time delay for signal propagation from the satellite to the VRS location.

The RTCM pseudorange corrections at a VRS location are calculated using the relation $$PRC(t;t0;m;n)_{VRS} = \epsilon R_{us}(t;t0;m;n) - \epsilon_S(t;t0;m) - \delta I(t;t0;m;n) - \delta T(t;t0;m;n) \quad (27)$$

With appropriate coverage of the region S with GPS reference stations, this embodiment may be used for a region S that is as large as the entire Earth. The RTCM format has been used here for illustration, but the invention is not limited to this format as the initial communication format. Any appropriate communication format can be used for the embodiments discussed here.

One or more VRSs can also be synthesized for use in static or kinematic surveying, from information available at the network central station. Here, the VRS synthesizes measurements as if received from a virtual receiver at a selected location. These measurements are used by surveyors as if this virtual receiver is an actual base station at the selected location.

A carrier phase measurement of the GPS signals received from satellite number m is obtained using the relation $$\phi_S(t1;t2;m;n) = \lambda \int_{t1}^{t2} \delta \omega(t;m;n) dt \quad (28)$$

$$\delta \omega(t;m;n) = \omega(t;n;rcvr) - \omega(t;m;rcvd) \quad (29)$$

$$\omega(t;n;rcvr) =_{GPS} + \epsilon \omega(t;m;n;rcvr) \quad (30)$$

$$\omega_{GPS} = c/\lambda, \quad (31)$$

where $\lambda$ is the GPS carrier wavelength (fixed: L1 or L2), $\omega(t;n;rcvr)$ is the nominal (fixed) angular frequency generated internally by the GPS receiver/processor (n, which may be a user location), $\omega$ (t;m;rcvd) is the angular frequency of the GPS signal received at the GPS antenna from the satellite, $_{GPS}$ is the (fixed) angular frequency associated with the GPS signal transmitted by the satellite, c is the velocity of light propagation in a vacuum, and carrier lock is assumed to be maintained. The satellite transmits at an angular frequency that may vary from the ideal frequency $\omega_{GPS}$ and is expressed as $$\omega(t;m;tr) = \omega_{GPS} + \epsilon \omega(t;m;sv) \quad (32)$$

Combining Eqs. (29), (30) and (32), the angular frequency difference $\delta \omega$ is then expressible as $$\omega(t; m; n) = \omega_{GPS} + \varepsilon\omega(t; m; n; rcvr) - \omega(t; n; rcvd) \quad (33)$$
$$= \omega(t; m; tr) - \varepsilon\omega(t; m; sv) + \varepsilon\omega(t; n; rcvr) - \omega(t; m; rcvd).$$

The Doppler shift $$\Delta\omega(t;m;n;\text{Doppler}) = \omega(t;m;tr) - \omega(t;m;rcvd) \quad (34)$$

arising from motion of the satellite antenna and the user's antenna relative to each other can be expressed to first order as $$\Delta\omega(t; m; n; \text{Doppler}) = \quad (35)$$
$$= (v_{sv}(t - t_{prop}; m) - v_{rcvr}(t; m)) \cdot e_{us}\omega(t; m; tr)/c,$$

where $v_{sv}$ and $v_{rcvr}$ are the time-varying velocity vectors for the satellite (m) and receiver (n), respectively, $e_{us}$ is the unit vector from the user antenna (n) to the satellite antenna (m), which may vary in direction, and where $t' = t - t_{prop}$ is the time at which a signal must be transmitted at the satellite antenna in order to arrive at the user antenna at time t, given that the time required for signal propagation between the two antennas is $t_{prop}$ Equations (34) and (35) may be combined as $$\omega(t;n;rcvd) = [1 - (v_{sv} - v_{rcvr})e_{us}/c]\omega(t;m;tr), \quad (36)$$

and Eqs. (31) and (34) may be combined as $$\delta\omega(t; m; n) = (v_{sv} - v_{rcvr})e_{us}(\omega(t; m; tr)/c) + \quad (37)$$
$$\varepsilon\omega(t; m; n; rcvr) - \varepsilon\omega(t; m; sv)$$
$$= (v_{sv} - V_{rcvr})e_{us}(\omega_{GPS}/c) + \varepsilon\omega(t; m; n; rcvr) -$$
$$[1 - (v_{sv} - v_{rcvr})e_{us}/c]\varepsilon\omega(t; m; sv)$$

The calculated carrier phase output from a virtual receiver at a specified location then becomes $$\phi(t1, t2, m, n) = \lambda \int_{t1}^{t2} \{(v_{sv} - v_{rcvr}) \cdot e_{us}(\omega_{GPS}/c) + \varepsilon\omega(t; m; n; rcvr) - \quad (38)$$
$$\{1 - (v_{sv} - v_{rcvr}) \cdot e_{us}/c\}\varepsilon\omega(t; m; sv)\}dt$$
$$= \int_{t1}^{t2} \{(v_{sv} - v_{rcvr}) \cdot e_{us} + \varepsilon\omega(t; m; n; rcvr)(c/\omega_{GPS}) -$$
$$\{1 - (v_{sv} - v_{rcvr}) \cdot e_{us}/c\}\varepsilon\omega(t; m; sv)(c/\omega_{GPS})\}dt$$
$$= \int_{t1}^{t2} \{(v_{sv} - v_{rcvr}) \cdot e_{us} +$$
$$\{\varepsilon\omega(t; n; rcvr) - \varepsilon\omega(t; m; sv)\}(c/\omega_{GPS})\}dt$$
$$= \int_{t1}^{t2} \{(v_{sv} - v_{rcvr}) \cdot e_{us} + c(d/dt)$$
$$\{\varepsilon\tau(t; n; rcvr) - \varepsilon\tau(t; m; sv)\}\}dt$$
$$= \int_{t1}^{t2} \{(v_{sv} - v_{rcvr}) \cdot e_{us} + (d/dt)(\phi_{rcvr} - \phi_{sv})\}dt.$$

Here, $$\phi_{rcvr}/c = \varepsilon\tau(t;n;rcvr), \quad (39)$$

$$\phi_{sv}/c = \varepsilon\tau(t;m;sv) \quad (40)$$

are the receiver clock error and satellite clock error, respectively, evaluated relative to GPS time. If account is also taken of the tropospheric and ionospheric time delays experienced by a signal in propagating from the satellite antenna to the receiver antenna, the change in carrier phase for a selected time interval $t1 \leq t \leq t2$ becomes $$\phi(t1,t2;m;n) = \int_{t1}^{t2} \{(v_{sv} - v_{rcvr}) \cdot e_{us} + (d/dt)[\phi_{rcvr} - \phi_{sv} + \delta T - \delta I]\}dt. \quad (41)$$

In synthesizing the phase measurement from a VRS receiver, the receiver clock offset term $_{rcvr}$ is defined as zero for the virtual receiver and the phase integral in Eq. (41) becomes $$\phi(t1, t2; m; n) = \quad (42)$$
$$\int_{t1}^{t2} \{(v_{sv} - v) \cdot e_{us} - (d/dt)\{\phi_{sv} - \delta T + \delta I\}\}dt$$
$$= R_{us}(t2; t_{prop}; m; n) -$$
$$R_{us}(t1; t_{prop}; m; n) - \phi_{sv}(t2; t_{prop,2}; m) ++$$
$$\phi_{sv}(t1; t_{prop,1}; m) + \delta T(t2; t_{prop,2}; m; n) -$$
$$\delta T(t1; t_{prop,1}; m; n) --$$
$$\delta I(t2; t_{prop,2}; m; n) + \delta I(t1; t_{prop,1}; m; n),$$

where $ti - t_{prop,i}$ ($i=1, 2$) is the time at which a signal must be transmitted at the satellite antenna in order to arrive at the user antenna at time $t = ti$, given that the time required for signal propagation between the two antennas is $t_{prop,i}$, Rus ($t; t_{prop}$; m;n) is calculated using ephemeredes contained in the GPS navigation message (corrected by the network), $\phi_{sv}(t; t_{prop}; m; n)$ is calculated using the satellite clock polynomial from the GPS navigation message (corrected by the network), and $\delta T(t; t_{prop}; m;n)$ and $\delta I(t; t_{prop}; m;n)$ are calculated using model parameters provided by the networks.

Using the notation developed above, the pseudorange measurement at a user's receiver can be expressed as $$PR(t;t;0;m;n) = R(t;t0;m;n)_{us} + \phi(t;t0;n;rcvr) - \phi(t,t0;m, sv) + \delta T(t;t0;m;n) + \delta I(t;t0;m;n). \quad (43)$$

This approach can be refined by causing the network central station to calculate the adjusted carrier phase measurement at each of several reference stations in the vicinity of the VRS of interest. These adjusted carrier phase measurements are then subtracted from the calculated carrier phase measurement made for the VRS location, and these differences are used in a minimum least squares computation to determine a scalar field of corrections for the calculated VRS carrier phase.

A mobile surveyor or navigator uses the synthesized measurements of pseudo range and/or carrier phase from Eqs. (42) and (43), computed for the VRS site, as if these measurements were received from a GPS reference station located at the VRS site.

Where carrier phase measurements are available at a high rate at the network central station, satellite velocity errors and errors in the rate of change of satellite clock offset can be determined. The measurement noise on carrier phase is at least an order of magnitude lower than the measurement noise on the corresponding pseudorange. Because of this difference, performance of the pseudorange-only approach adopted in the earlier patent application (U.S. Ser. No. 08/177,012) can be enhanced by adding velocity states and using carrier phase measurements.

Kalman filtering can be used at the network central station to estimate the errors in satellite locations and satellite clocks. This approach for the pseudorange-only variables is summarized from the earlier patent application, and an extension that includes velocity variables is also presented here. The state vector is described as $x=[x_1\ x_2\ x_3\ x_4]^{tr}=[\epsilon_c\ \epsilon_d\ \epsilon_r\ S]^{tr}$, where $x_4=\phi_S=c\epsilon T_S$ is the error remaining in the satellite's clock, after correction with the parameters in the satellite's navigation message, multiplied by the velocity of light in a vacuum. The three states $x_i$ (i=1, 2, 3) are errors in the satellite's location, as calculated from parameters in the satellite's navigation message, for example, using Eq. (24). The measurement vector is $z_{pr}=[z_1\ z_2,\ \ldots\ z_L]$, where L is the number of stations that have a pseudorange measurement for a given satellite and $z_i$ is the difference between the measured pseudorange and the pseudorange calculated by Eqs. (1)-(5). In the context of the equations presented here, $$z_i = e_{us,i} \epsilon r - \phi_S + v_i = e_{us,i} \cdot (\epsilon_c e_c + \epsilon_d e_d + \epsilon_r e_r) - \phi_S + v_i, \quad (44)$$

where $e_{us,i}$ is the unit length vector $e_{us}$, determined from the location of the ith station, and $v_i$ is noise present in the measurement of the pseudorange. Each measurement $z_{pr}$ at time $t_K$ is related to the pseudorange filter states x, using a 4×L transformation matrix $H_k=(h_{ij}(t_k))$, by the relations $$z_{pr,k} = H_k x_k + v_k, \quad (45)$$

$$h_{i1} = \partial z_i / \partial x_1 = e_{us,i} \cdot e_c, (i=1, \ldots, L) \quad (46)$$

$$h_{i2} = \partial z_i / \partial x_2 = e_{us,i} \cdot e_d, \quad (47)$$

$$h_{i3} = \partial z_i / \partial x_3 = e_{us,i} \cdot e_r, \quad (48)$$

$$h_{i4} = -1, \quad (49)$$

$$v_k = L \times I \text{ measurement noise vector at time } t_k, \quad (50)$$

$$R_k = E[v_k v_k^{tr}] \quad (51)$$

Equation (45) may also be written as a sequence of scalar equations for an individual (scalar) measurement $Z_{pr,k,i}$ for a selected station (i=1, ..., L).

Transitions between the filter states are described by the relations $$x_k = \Phi_k x_{k-1} + w_k, \quad (52)$$

where $\phi_k$ is the state transition matrix, which can be modeled here as the 4×4 identity matrix, and $w_k$ is a noise vector with covariance matrix $$Q_k = E[w_k w_k^{tr}]. \quad (53)$$

The covariance matrix $P_k = E\{X_k x_k^{tr}\}$ of the filter states propagates according to the relation $$P'_k = \Phi_k P_{k-1} \Phi_k^{tr} + Q_{k-1}, \quad (54)$$

and the primed value $P'_k$ represents the covariance matrix $P_k$ before the new measurement is incorporated (obtained by propagation from the preceding state).

Measurements are incorporated by the relations $$x_k = x'_k + K_k(z_k - H_k x'_k), \quad (55)$$

$$x'_k = \Phi_k x_{k-1}, \quad (56)$$

$$K_k = P'_k H_k^{tr} [H_k P'_k H_k^{tr} + R_k]^{-1} = \text{Kalman gain matrix}, \quad (57)$$

where $x_k'$ is a predicted value of $x_k$. The state covariance matrix, after incorporation of the new measurement, is given by the relation $$P_k = (I - K_k H_k) P'_k d\,k. \quad (58)$$

The initial value matrices $P_0$ and $Q_0$ are selected design parameters. Equations (44)-(58) can be used to perform Kalman filtering on the measured quantities to estimate the errors in satellite location and time coordinates.

The difference between two carrier phase measurements $\phi(t_{meas,k}; m; n)$ and $\phi(t_{meas,k-1}; m; n)$, separated by a short time interval $\Delta t_k = t_k - t_{k-1}$, can be expressed using the integral in Eq. (54), viz.

$$\Delta\phi(t_{meas,k}; m; n) = \phi(t_{meas,k}; m; n) - \phi(t_{meas,k} - 1; m; n) \quad (59)$$
$$= \{(v_{sv} - v_{rcvr})e_{us} + (d/dt)[\phi_{rcvr} - \phi_{sv} + \delta T - \delta I]\}dt$$
$$= \{(v_{sv} - v_{rcvr})e_{us} + (d/dt)[\phi_{rcvr} - \phi_{sv} + \delta T - \delta I]\}\Delta t_k.$$

An extended measurement can be constructed from this difference by defining the scalar quantities $$z_{cp,k} = \{(v_{sv} - v_{rcvr})e_{us} + (d/dt)[\phi_{sv} - \delta T + \delta I]\}\Delta t_k. - \quad (60)$$
$$\Delta\phi(t_{meas,k}; m; n)$$
$$= [\epsilon v_{sv} e_{us} - (d/dt)(\epsilon\phi_{sv} - \epsilon\delta T + \epsilon\delta I)]\Delta t_k -$$
$$\Delta\epsilon\phi(t_{meas,k}; m; n)$$
$$= (\epsilon v_{sv} e_{us} - (d/dt)(\epsilon\phi_{sv})\Delta t_k + v_k,$$

where $$v_k = (d/dt)(\epsilon\delta T - \epsilon\delta I)\Delta t_k - \Delta\epsilon\phi(t_{meas,k}; m; n) \quad (61)$$

is an extended measurement error.

An augmented state column matrix $$x_A = \begin{bmatrix} x \\ y \end{bmatrix} \quad (62)$$

is defined, where x is the four-dimensional state defined in the system of satellite location and clock errors, viz.

$$x = \begin{bmatrix} x_1 \\ x_2 \\ x_3 \\ x_4 \end{bmatrix} = \begin{bmatrix} \epsilon x_{orb} \\ \epsilon y_{orb} \\ \epsilon z_{orb} \\ \epsilon\phi \end{bmatrix} \quad (63)$$

and $v=(d/dt)$ x. The augmented measurement state is related to an augmented error state by the following augmented matrix equations for Kalman filtering $$z_{A,k} = z_A(t_k; t0; m; VRS) \quad (64)$$
$$= [z_{pr}(t_k; t0; m; VRS) Z_{cp}(t_k; t0; m; VRS)]^{tr},$$

$$z_{A,k} = H_{A,k} x_A(tk; t0; m; VRS) + v_A(t_k; t0; m; VRS) \quad (65)$$
$$= H_{A,k} x_{A,k} + v_{A,k},$$

$$Z_{A,k} = \begin{bmatrix} z_{pr,k} \\ z_{cp} \end{bmatrix} = \begin{bmatrix} h_k^{tr} & 0 \\ 0 & \Delta t h_k^{tr} \end{bmatrix} \begin{bmatrix} x \\ v \end{bmatrix} + \begin{bmatrix} v_{pr,k} \\ v_{cp,k} \end{bmatrix} \quad (66)$$

$$H_{A,k} = \begin{bmatrix} h_k^{tr} & 0 \\ 0 & \Delta t h_k^{tr} \end{bmatrix} \quad (67)$$

$h_k = [h_1(t_k) h_2(t_k) h_3(t_k) h_4(t_k)]$ 1×4 matrix with entries (68)

$h_1 = e_{us} e_{x.orb}$, (69)

$h_2 = e_{us} e_{y.orb}$, (70)

$h_3 = e_{us} e_{z.orb}$, (71)

$h_4 = -1$, (72)

$x_{A,k} = [x1\, x2\, x3\, x4\, v1\, v2\, v3\, v4]^{tr} = [xv]^{tr}$, (73)

$xi = \epsilon_{i,m}(t_k), (i=1, 2, 3)$ (74)

$x4 = \phi_{s,m}(t_k)$, (75)

$vi = (d/dt)xi\ (i=1, 2, 3, 4)$, (76)

$v_{pr,k}$=pseudorange measurement noise vector at time $t_k$, (77)

$v_{cp,k}$=carrier phase measurement noise vector at time $t_k$, (78)

$v_{A,k} = [v_{pr,k} v_{cp,k}]^{tr}$, (79)

$R_k = E[v_{A,k} v_{A,k}^{tr}]$, (80)

$x_{A,k} = \Phi_{A,k} x_{A,k-1} + w_{A,k}$, (81)

$\Phi_{A,k}$=state transition matrix for vector $x_{A,k}$ at time $t_k$, (82)

$w_{A,k}$=noise vector at time $t_k$, (83)

$Q_{A,k} = E[w_{A,k} w_{A,k}^{tr}]$, (84)

$P'_{A,k} = \Phi_{A,k} P_{A,k-1} \Phi_{A,k}^{tr} + Q_{A,k-1}$, (85)

$x_{A,k} = x'_{A,k} + K_{A,k}(z_{A,k} - H_{A,k} x'_{A,k})$, (86)

$x'_{A,k} = \Phi_{A,k} x_{A,k-1}$, (87)

$K_{A,k} = P_{A,k} H_{A,k}^{tr} [H_{A,k} P'_{A,k} H_{A,k}^{tr} + R_{A,k}]^{-1}$, (88)

$P_{A,k} = (I - K_{A,k} H_{A,k}) P'_{A,k} = E\{x_{A,k} x_{A,k}^{tr}\}$, (89)

where $P_{A,0}$ and $Q_{A,0}$ selected initial matrices, I is the 8×8 identity matrix and 0 is a 1×4 matrix with zero entries.

Figure 4:
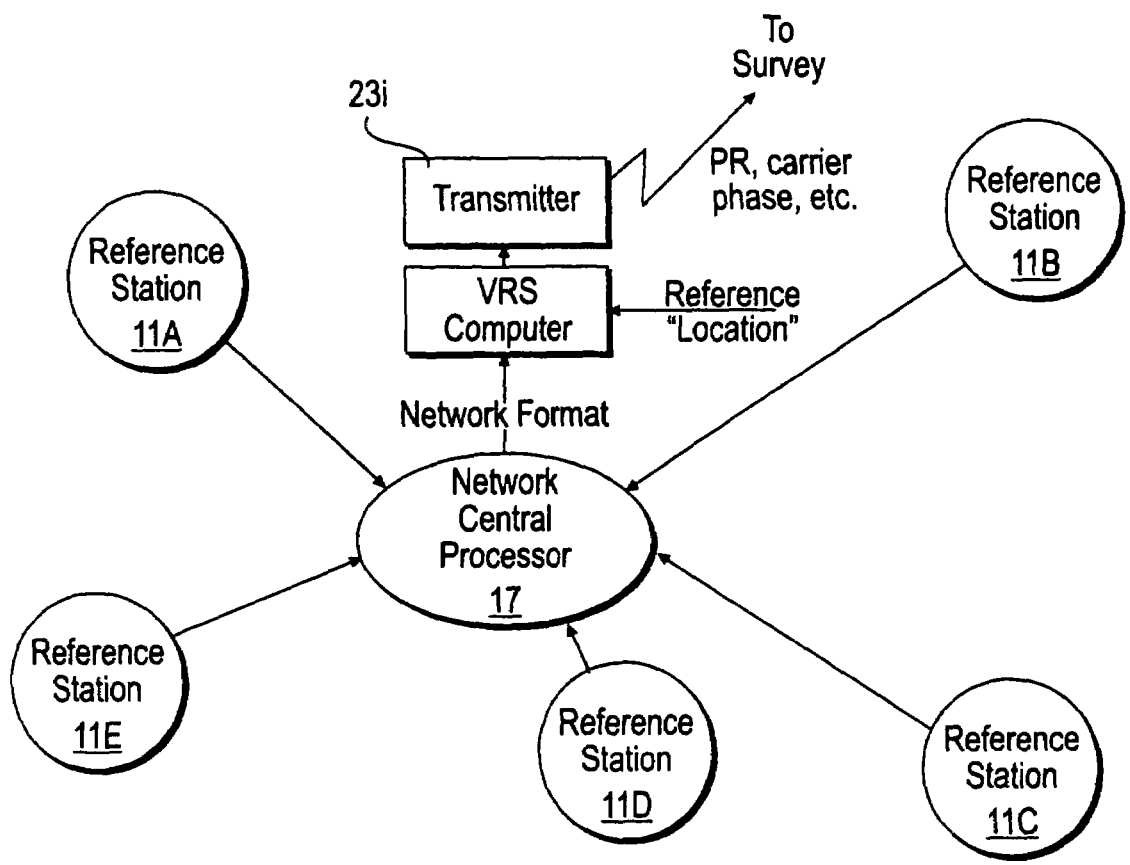

Transitions between the filter states may be described by the relations $x_{A,k} = \Phi_{A,k} x_{A,k-1} + w_{A,k}$, (90)

where $W_{A,k}$ is the state noise vector and $\Phi_{A,k}$ is an 8×8 state transition matrix $$\Phi_{A,k} = \begin{bmatrix} I & I\Delta t_k \\ 0 & I \end{bmatrix} \quad (91)$$

and 0 and I are the 4×4 zero matrix and 4×4 identity matrix, respectively. Note that the transition matrix $\Phi_{A,k}$ now explicitly depends upon a time difference $\Delta_{tk}$. Carrier phase measurements are used in surveying. A VRS (dedicated or ad hoc) 23i in FIG. 4 has a "location," for which it provides corrected GPS-based location information, and serves as a reference point for a survey baseline.

The RTCM SC-I 04 standard and format is one of many that can be used for transmission of location data and correction data for use in navigation and in surveying. In navigation activities, the Wide Area Augmented System (WAAS) and other non-proprietary, as well as proprietary, formats can also be used. In WAAS, using standards specified by the Federal Aviation Administration, individual error sources are analyzed and their variations with time are modelled. The WAAS seeks to improve the accuracy at any given range, and thereby to increase the permitted range, of GPS measurements. In surveying activities, one popular "generic" format is the Receiver Independent Exchange format (RINEX), which allows data from a transmitter or receiver operating in one format to be used with a transmitter or receiver in another format. Use of VRSs as disclosed here would allow translation from a first format to a second format, in a manner somewhat analogous to use of a gateway to allow protocol-to-protocol translation between two data communication networks.

Whether operating in a navigation activity, in a surveying activity or in any other activity, the approach disclosed here implements this format translation at the central station or at a remote VRS. If the VRS is truly virtual and is not represented at its assigned site by a computer and/or transceiver, format translation is implemented at the central station and transmitted as if a physical station, positioned at the VRS location, is performing the format translation.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SA TPS, are the Global Positioning System and the Global Orbiting Navigational System.

The Global Positioning System (OPS) is part of a satellite-based navigation system developed by the United States Defense Department under its NA VSTAR satellite program. A fully operational GPS includes up to 24 satellites approximately uniformly dispersed around six circular orbits with four satellites each, the orbits being inclined at an angle of 550 relative to the equator and being separated from each other by multiples of 600 longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^2$). This phenomenon is discussed in the document ICD-GPS-200, op. cit. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the ICD-GPS-200 document, op. cit.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*. Van Nostrand Reinhold, New York, 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k(=0, 1, 2, ..., 23) is the channel or number. These frequencies lie in two bands at 1.597-1.617 GHz (L1) and 1,240-1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for surveyor construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 17-90. The information in this material is incorporated by reference herein.

What is claimed is:

1. A method of providing GPS pseudorange correction information for navigation over a selected geographic region of arbitrary size, the method comprising:

receiving GPS signals from at least three GPS satellites at each of three or more spaced apart GPS reference stations whose location coordinates in a selected coordinate system are known, within the selected geographic region, where each reference station transmits GPS information signals, including information obtained from the GPS signals received;

receiving the GPS information signals transmitted by each reference station at a central station, obtaining ephemeris information for each of the satellites, estimating a satellite location error vector for each satellite from the information obtained from the GPS signals and from the ephemeris information, determining for each satellite a component of range error at a selected location due to satellite location error, and making available the component of range error for each satellite to compensate for satellite location error when computing a position estimate from GPS signals received at a mobile station location.

2. The method of claim 1, wherein determining a component of range error comprises, for each satellite: determining a calculated range from the selected location to the satellites; and combining the calculated range with the satellite location error vector.

3. The method of claim 2, wherein estimating a satellite location error vector for each satellite comprises: determining from the GPS signals a measured location of the satellite; determining from satellite ephemeris information a calculated location of the satellite; and comparing the measured location with the calculated location to determine the satellite location vector.

4. The method of claim 3, further comprising, at a mobile station location: receiving GPS signals from the satellites; and applying the component of range error for each satellite to compute from the GPS signals received at the mobile station location a compensated estimate of the mobile station location.

5. The method of claim 4, wherein the component of range error is determined for each satellite at a central station and transmitted to the mobile station location.

6. The method of claim 2, further comprising, at a mobile station location: receiving GPS signals from the satellites; and applying the component of range error for each satellite to compute from the GPS signals received at the mobile station location a compensated estimate of the mobile station location.

7. The method of claim 3, wherein the component of range error is transmitted with an issue of data ephemeris label.

8. The method of claim 1, wherein estimating a satellite location error vector for each satellite comprises: determining from the GPS signals a measured location of the satellite; determining from satellite ephemeris information a calculated location of the satellite; and comparing the measured location with the calculated location to determine the satellite location vector.

9. The method of claim 8, further comprising, at a mobile station location: receiving GPS signals from the satellites; and applying the component of range error for each satellite to compute from the GPS signals received at the mobile station location a compensated estimate of the mobile station location.

10. The method of claim 9, further comprising determining for each satellite a pseudorange correction at the selected location by combining the component of range error for the satellite with an estimated clock error for the satellite and with a tropospheric delay correction and with an ionospheric delay correction.

11. The method of claim 1, further comprising calculating for the selected location an azimuth angle and an elevation angle for each satellite, and making the azimuth angle and the elevation angle for each satellite available to compensate at the mobile station location for at least one of ionospheric delay correction and tropospheric delay correction.

12. The method of claim 1, wherein the selected location corresponds approximately to the mobile station location.

13. The method of claim 1, wherein determining a component of range error comprises running a Kalman filter having, for each satellite, states for satellite clock error and for components of a satellite location error vector.

14. The method of claim 1, wherein making available the component of range error for each satellite comprises synthesizing a virtual-reference-station correction message which simulates a correction message that would be produced by a real reference station receiving GPS signals at the selected location.

15. The method of claim 14, wherein the information obtained from the GPS signals is derived from carrier phase measurements of GPS signals received at the reference stations, and wherein the method further comprises: for each satellite, estimating from the signal information a satellite velocity error.

16. The method of claim 1, wherein the information obtained from the GPS signals is derived from carrier phase measurements of GPS signals received at the reference stations, and wherein the method further comprises: for each satellite, estimating from the signal information a satellite velocity error.

17. The method of claim 1, wherein the signal information is derived from GPS signals obtained at an observation time during which at least one satellite is visible from at least three reference stations.

* * * * *